Patented June 1, 1948

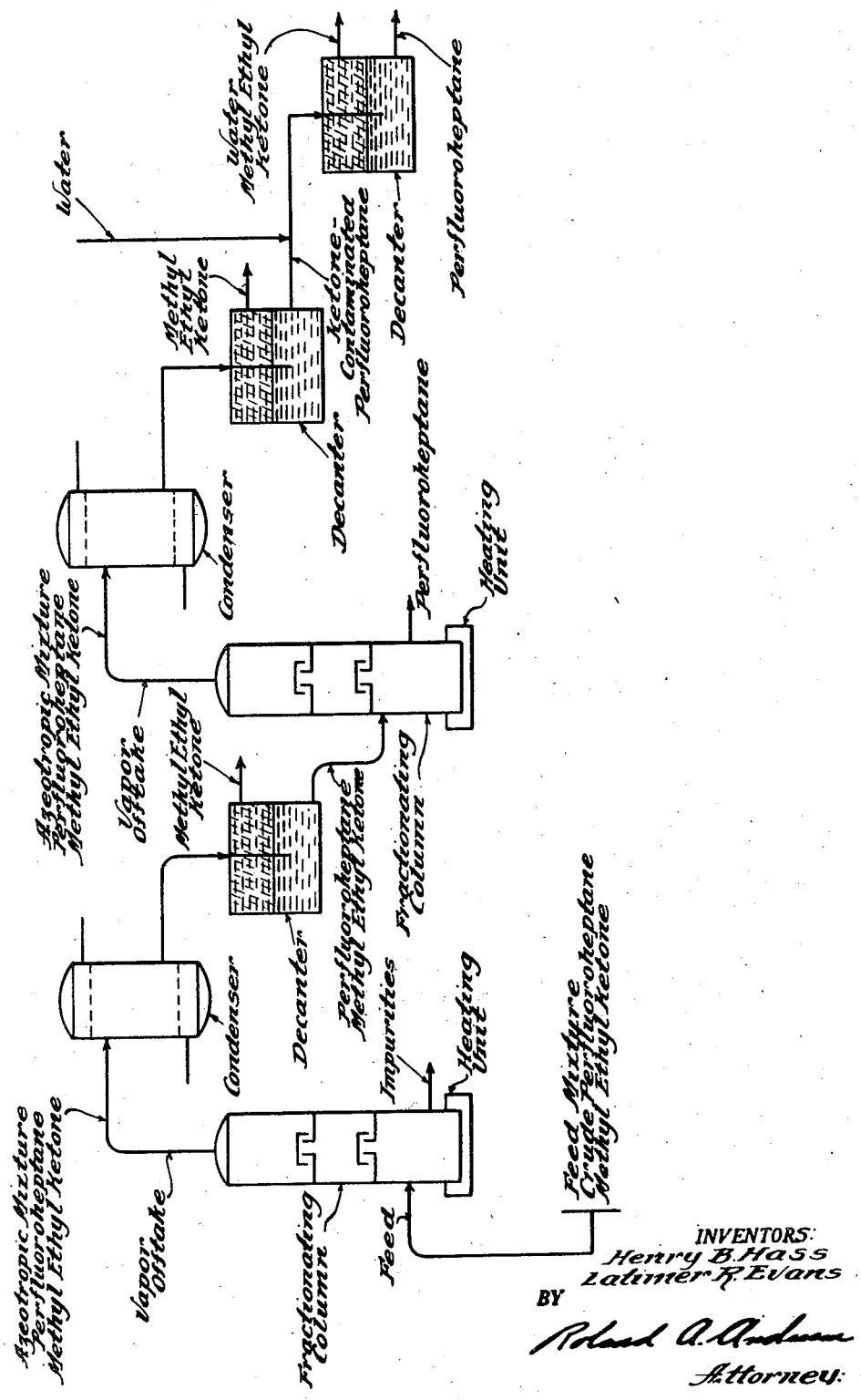

2,442,589

UNITED STATES PATENT OFFICE 2,442,589

PURIFICATION OF PERFLUOROHEPTANE BY AZEOTROPIC DISTILLATION WITH METHYL ETHYL KETONE

Latimer R. Evans, Wilmington, Del., and Henry B. Hass, West Lafayette, Ind., assignors to the United States of America as represented by the United States Atomic Energy Commission Application March 19, 1946, Serial No. 655,584

4 Claims. (Cl. 202—42)

This invention relates to the purification of perfluoroheptane. It particularly relates to the separation of chlorofluorocarbons from mixtures of perfluoroheptane with such compounds.

Perfluoroheptane may be prepare by the reaction of metal perfluorides, such as cobalt trifluoride, manganese trifluoride and silver difluoride, with normal heptane. However the manufacture of the metal perfluorides employed in such processes is a relatively costly procedure because it requires the use of elemental fluorine. In order to minimize the quantities of such reagents employed in the manufacture of perfluoroheptane, a process has been developed involving chlorination of normal heptane to an average chlorine content of ten to twelve chlorine atoms per molecule, fluorination of the resulting polychloroheptane mixture by treatment with hydrogen fluoride in the presence of pentavalent antimony fluorochlorides, and treatment of the more highly fluorinated fractions of the resulting product with cobalt trifluoride or silver difluoride. This latter procedure results in the consumption of substantially smaller quantities of the fluorides requiring elemental fluorine in their preparation but has the disadvantage that since some of the chlorine-containing organic by-products boil in the same range as perfluoroheptane and it has been impossible, as a practical matter, to eliminate these impurities by simple rectification, the product as obtained in the final treatment normally includes between 2% and 7% of organic chlorine.

It is an object of the present invention to purify perfluoroheptane. It is a further object of the invention to remove associated impurities boiling from the crude product in the same temperature range as the perfluoroheptane. A further object of the invention is the production of perfluoroheptane free from chlorofluorocarbon by-products. A still further object is the accomplishment of these purposes in a simple and efficient manner without resort to complex chemical operations. Further objects will appear from the following general description of the invention and detailed examples of its application.

In accordance with the present invention a crude perfluoroheptane mixture containing chlorofluorocarbons boiling from the mixture in the same temperature range as the perfluoroheptane is subjected to fractional distillation with methyl ethyl ketone at a vapor temperature below the temperature of distillation of the chlorofluorocarbons from the mixture.

The crude perfluoroheptane fraction obtained by fractional distillation of the product of cobalt trifluoride or silver difluoride treatment of the more highly fluorinated compounds obtained in the chlorination, hydrogen fluoride fluorination process boils between about 80° C. and about 85° C. at normal atmospheric pressure. Methyl ethyl ketone boils at about 79.6°. On the other hand, a mixture of the perfluoroheptane fraction with a substantial proportion of methyl ethyl ketone has an initial boiling temperature of about 62–63° C. By fractionally distilling the mixture so as to retain higher-boiling fractions in the distill and. a distillate fraction essentially free of chlorine is obtained. Part of the methyl ethyl ketone may be separated from the perfluoroheptane by decantation and the dissolved ketone may be removed by washing with water and, if desired, by washing with aqueous sodium bisulfite, $NaHSO_3$, solution. Since perfluoroheptane is substantially insoluble in water whereas methyl ethyl ketone is soluble therein, satisfactory separation of the perfluoroheptane and methyl ethyl ketone can be effected by water-washing alone. Methyl ethyl ketone is soluble in pure perfluoroheptane only to the extent of about 10% by weight; hence most of the ketone may be separated from the perfluoroheptane distillate by decantation. In order to still further reduce the quantity of methyl ethyl ketone to be removed by water-washing, the purified perfluoroheptane, after decantation of the ketone phase, may be redistilled to remove a ketone azeotrope, leaving as distillation residue perfluoroheptane free from methyl ethyl ketone. The distillate of this distillation then may be subjected to decantation to separate the ketone from the perfluoroheptane, and the latter, containing dissolved ketone, may be either washed with water or returned to the still for distillation with a subsequent batch of ketone-contaminated perfluoroheptane.

Since one of the chlorofluorocarbon impurites normally associated with perfluoroheptane obtained by the process described forms with methyl ethyl ketone an azeotrope distilling, at normal atmospheric pressure, at about 65.5° to about 66.8° C., the distillation should be controlled to avoid a distillation temperature rise of more than about 2° C. above the distillation temperature of the perfluoroheptane methyl ethyl ketone azeotrope.

A preferred method of purifying perfluoroheptane as discussed in the prior paragraphs is illustrated in the accompanying diagrammatic drawing. In this preferred process a feed mixture of crude perfluoroheptane and methyl ethyl ketone is distilled in a fractionating column and the vaporized azeotropic mixture of perfluoroheptane and methyl ethyl ketone is condensed in a condenser and then fed into a decanter where most of the methyl ethyl ketone is separated from the perfluoroheptane by decantation. The remainder of the methyl ethyl ketone is removed by redistilling in a fractionating column the perfluoroheptane containing dissolved methyl ethyl ketone and condensing the vaporized ketone azeotrope in a condenser, thus leaving a distillation residue of perfluoroheptane free from methyl ethyl ketone. The condensed vaporized ketone azeotrope of this distillation is then fed into a decanter, and most of the methyl ethyl ketone is separated from the perfluoroheptane of the azeotropic mixture by decantation. The latter perfluoroheptane containing dissolved methyl ethyl ketone is then mixed with water and fed into another decanter where the methyl ethyl ketone is separated with the water from the perfluoroheptane by decantation.

While the process is capable of satisfactory operation at pressures either above or below atmospheric pressure, provided the distillation temperatures are adjusted to compensate for the variation in pressure, standard atmospheric pressure distillation is entirely effective and therefore resort to either of these alternatives is not necessary.

The codistillation of the crude perfluoroheptane with methyl ethyl ketone may be carried out in conventional fractional distillation equipment of either the batch type or continuous type.

The proportion of methyl ethyl ketone required for effecting the distillation of a pure perfluoroheptane from crude mixtures thereof is not critical. A small proportion of the perfluoroheptane in pure form may be recovered using very low ratios of methyl ethyl ketone to the crude material. However, in order to recover all of the perfluoroheptane from a crude mixture it is necessary to supply sufficient ketone to provide a ketone to perfluoroheptane ratio in the distillate vapors corresponding to the ratio in the azeotrope (about 4:7). The quantity of methyl ethyl ketone necessary for accomplishing this result may be present at the beginning of the distillation or it may be added as the distillation proceeds. In continuous operations it is expeditious to add the crude material and the methyl ethyl ketone at an intermediate point in the distillation column.

The following examples further illustrate the process of the invention.

EXAMPLE 1

Crude perfluoroheptane was obtained by a process which involved (1) chlorinating normal heptane in the presence of light using gaseous chlorine until a chlorine content of about 83% chlorine was obtained, (2) treating the chlorinated product with hydrogen fluoride in the presence of fluorochlorides of pentavalent antimony, (3) separating from the resultant product a fraction distilling below 138° C., (4) treating this fraction with cobalt trifluoride at a temperature of 300° C. to 350° C. and (5) separating from the resultant fluorination product a distillate fraction boiling at 80–85° C. at atmospheric pressure. Seventy-nine milliliters of the crude 80–85° C. fraction containing 2.9% organic chlorine was washed by mixing it with an equal volume of methyl ethyl ketone and separating the ketone phase from the perfluoroheptane phase. The washed perfluoroheptane, (77 ml.) which contained 2.6% chlorine and a minor proportion of dissolved ketone, was then mixed with an equal volume of fresh methyl ethyl ketone and the mixture was fractionally distilled in a 4 ft. Podbielniak Hyper-cal column.

The distillate fractions were washed with water to remove ketone and the refractive indices and chlorine contents of the washed fractions were determined. The data are tabulated below.

Table I

| Fraction | Distillation Temperature, °C. | Total Volume, ml. | Volume After Washing, ml. | Refractive Index at 20° C. | Per cent Cl |
|---|---|---|---|---|---|
| A | 53.0–61.2 | 3.2 | 1.3 | 1.270 | 0.8 |
| B | 61.2–63.0 | 50.5 | 45.2 | 1.265 | 0.2 |
| C | 63.0–65.7 | 6.3 | 4.2 | 1.275 | 4.9 |
| D | 65.7–67.0 | 6.0 | 4.4 | 1.284 | 9.8 |
| E | 67.0–72.5 | 8.1 | 3.2 | 1.301 | 13.2 |
| Res. | | 56.5 | | | |

The molecular weight of washed fraction B was 386 confirming the identity of this fraction as essentially pure perfluoroheptane. Molecular weights of 351 and 313 for washed fractions D and E indicated that these were probably six-carbon perhalides, or in the case of fraction E, possibly five-carbon perhalides, and their chlorine content indicated that they contained one chlorine atom per molecule.

EXAMPLE 2

Two hundred fifty-two milliliters of crude perfluoroheptane product (which was obtained as described in Example 1; had a boiling range of 80–84° C.; contained 4.0% chlorine, 75.8% fluorine, and 0.077% hydrogen; and had an average molecular weight of about 366) was mixed with 300 milliliters of methyl ethyl ketone and the mixture was rectified in the same equipment employed in Example 1. Several fractions were collected and in each case the total distillate was first measured; then the ketone phase was decanted off from the fluorocarbon phase and the latter was washed with water to remove dissolved ketone. The volume of the washed fluorocarbon phase was then measured and data as to chlorine content, fluorine content, molecular weight, and refractive index determined. The data obtained in this manner are tabulated below:

Table II

| Fraction | Distillation Temperature, °C. | Total Volume, ml. | Volume After Washing, ml. | Refractive Index at 20° C. | Percent Cl | Percent F | Molecular Weight |
|---|---|---|---|---|---|---|---|
| A | 49–61.4 | 15.8 | 8.8 | 1.272 | 1.2 | 75.7 | 321 |
| B | 61.4–62.2 | 13.3 | 7.0 | 1.265 | 0.7 | 77.5 | 360 |
| C | 62.2–63.3 | 284.5 | 160.0 | 1.265 | 0.0 | 78.7 | 381 |
| D | 63.3–65.5 | 4.8 | 2.7 | 1.273 | | | |
| E | 65.5–66.8 | 64.8 | 41.2 | 1.287 | 0.4 | 70.0 | 335 |
| F | 66.8–71.7 | 5.3 | 2.2 | 1.306 | | | |
| G | 71.7–72.3 | 18.7 | 8.1 | 1.324 | 22.5 | 57.4 | 288 |
| H | 72.3–73.5 | 20.4 | 7.3 | 1.331 | 22.6 | 55.1 | 277 |
| Res. | | 118.2 | 1.1 | | | | |

For further purification fraction C was washed with aqueous NaHSO₃ solution and then subjected to distillation with rectification without the addition of an azeotropic agent. A foreshot distilling from 79.0° to 81.6° C. was thus obtained. The remainder of the fraction distilled at 81.6–81.9° C. This distillate was found to contain 0.0% Cl, 0.01% H, and 77.9% F and to have a molecular weight of 387–388.

It will be understood that we intend to include variations and modifications of the invention and that the preceding examples are illustrations only and in no wise to be construed as limitations upon the invention, the scope of which is defined in the appended claims, wherein

We claim:

1. The method of purifying perfluoroheptane contaminated with impurities resulting from the method of its preparation by fluorinating polychlorinated heptane and boiling from the crude mixture in the same temperature range as the perfluoroheptane, which comprises mixing the crude perfluoroheptane with methyl ethyl ketone and fractionally distilling the mixture at a vapor temperature below the distillation temperature of said impurities from the mixture.

2. The method of purifying perfluoroheptane containing chlorofluorocarbons boiling from the crude mixture in the same temperature range as the perfluoroheptane, which comprises mixing the crude perfluoroheptane with methyl ethyl ketone and fractionally distilling the mixture at a vapor temperature below the distillation temperature of said chlorofluorocarbons from the mixture.

3. The method of purifying a crude perfluoroheptane obtained by the fluorination of a polychlorinated normal heptane, which comprises codistilling the perfluoroheptane with methyl ethyl ketone at about normal atmospheric pressure at a vapor temperature below 65° C. so as to separate a distillate comprising perfluoroheptane and methyl ethyl ketone from a distillation residue comprising chlorofluorocarbon impurities and methyl ethyl ketone and separating the perfluoroheptane distillate from the bulk of the methyl ethyl ketone distillate by decantation.

4. The process of the preceding claim wherein the perfluoroheptane distillate product is further purified by a fractional distillation to remove dissolved methyl ethyl ketone, leaving as distillation residue purified perfluoroheptane substantially free from innate chlorofluorocarbon impurities and methyl ethyl ketone.

LATIMER R. EVANS.
HENRY B. HASS.

REFERENCES CITED

The following references are of record in the file of this patent:

UNITED STATES PATENTS

| Number | Name | Date |
|---|---|---|
| 2,341,433 | Fisher | Feb. 8, 1944 |
| 2,352,268 | Kimberlin | June 27, 1944 |
| 2,388,040 | Clark | Oct. 30, 1945 |

FOREIGN PATENTS

| Number | Country | Date |
|---|---|---|
| 616,596 | Germany | Aug. 1, 1935 |